Sept. 6, 1949.	T. W. CHEW	2,481,082
TELEVISION CAMERA LENS SWITCHING DEVICE
Filed June 4, 1945	3 Sheets-Sheet 1
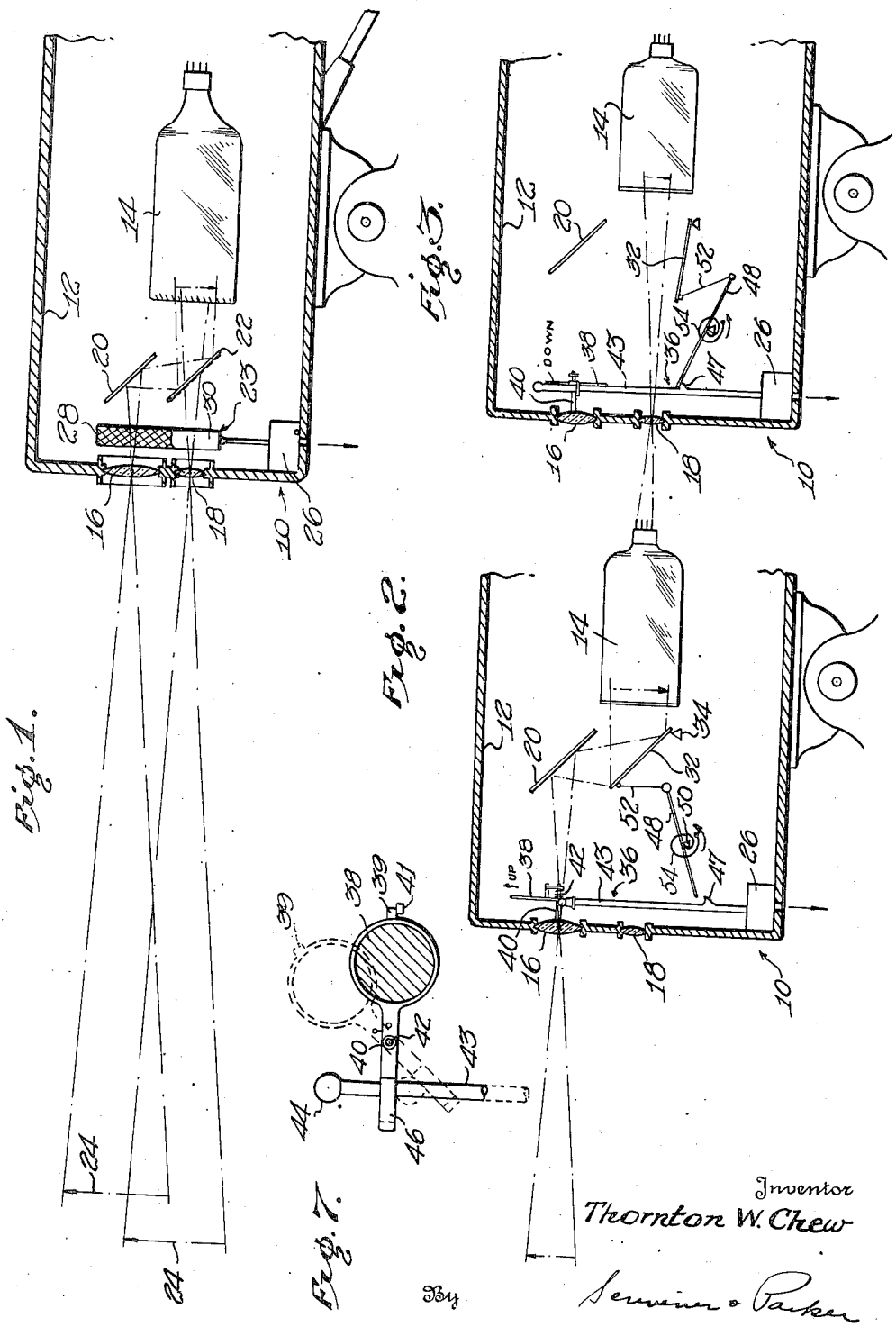
Inventor
Thornton W. Chew
By
Scrivener & Parker
Attorneys Sept. 6, 1949.  T. W. CHEW  2,481,082
TELEVISION CAMERA LENS SWITCHING DEVICE
Filed June 4, 1945  3 Sheets-Sheet 2
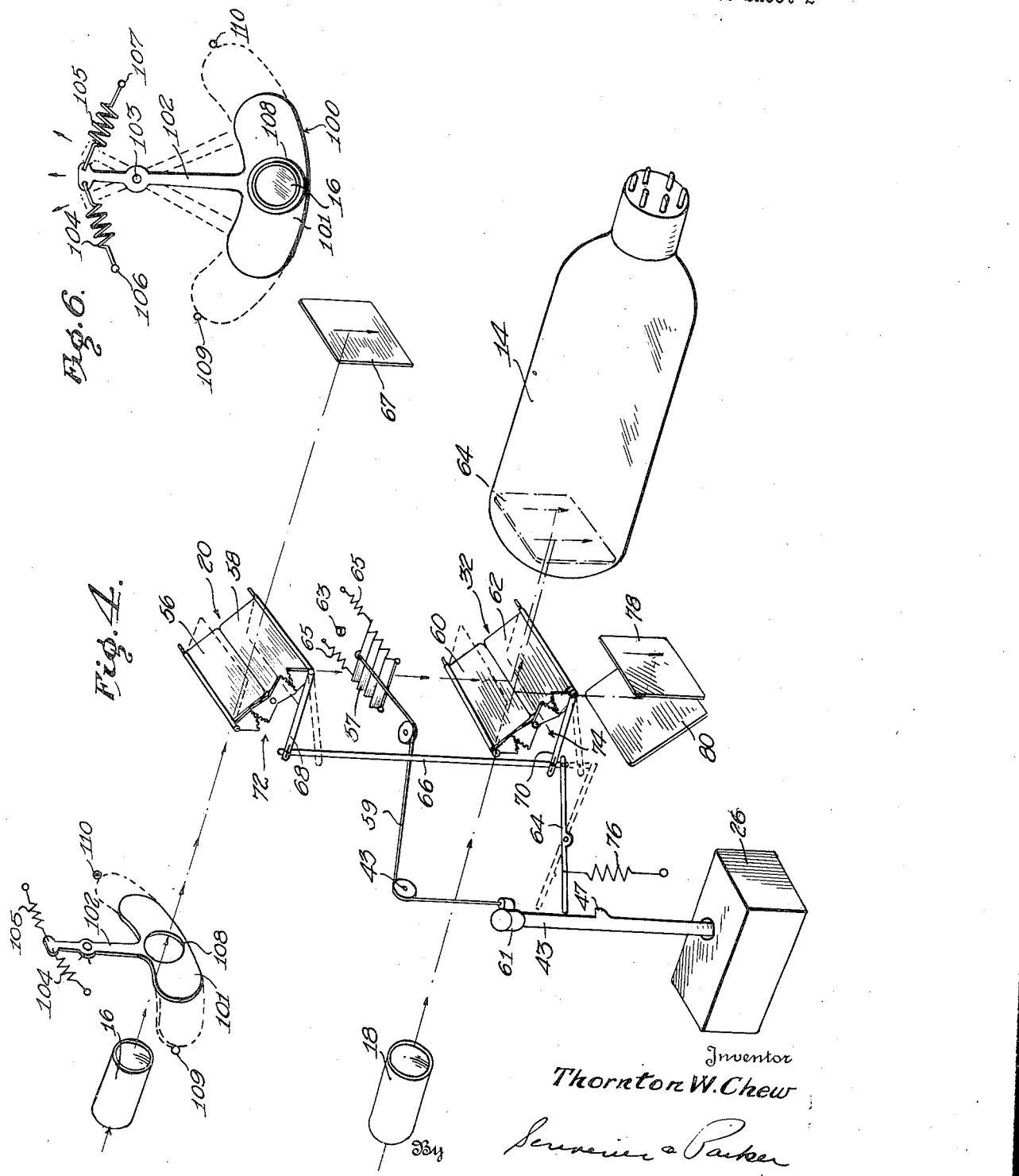
Inventor
Thornton W. Chew
By Sevrier & Parker
Attorneys

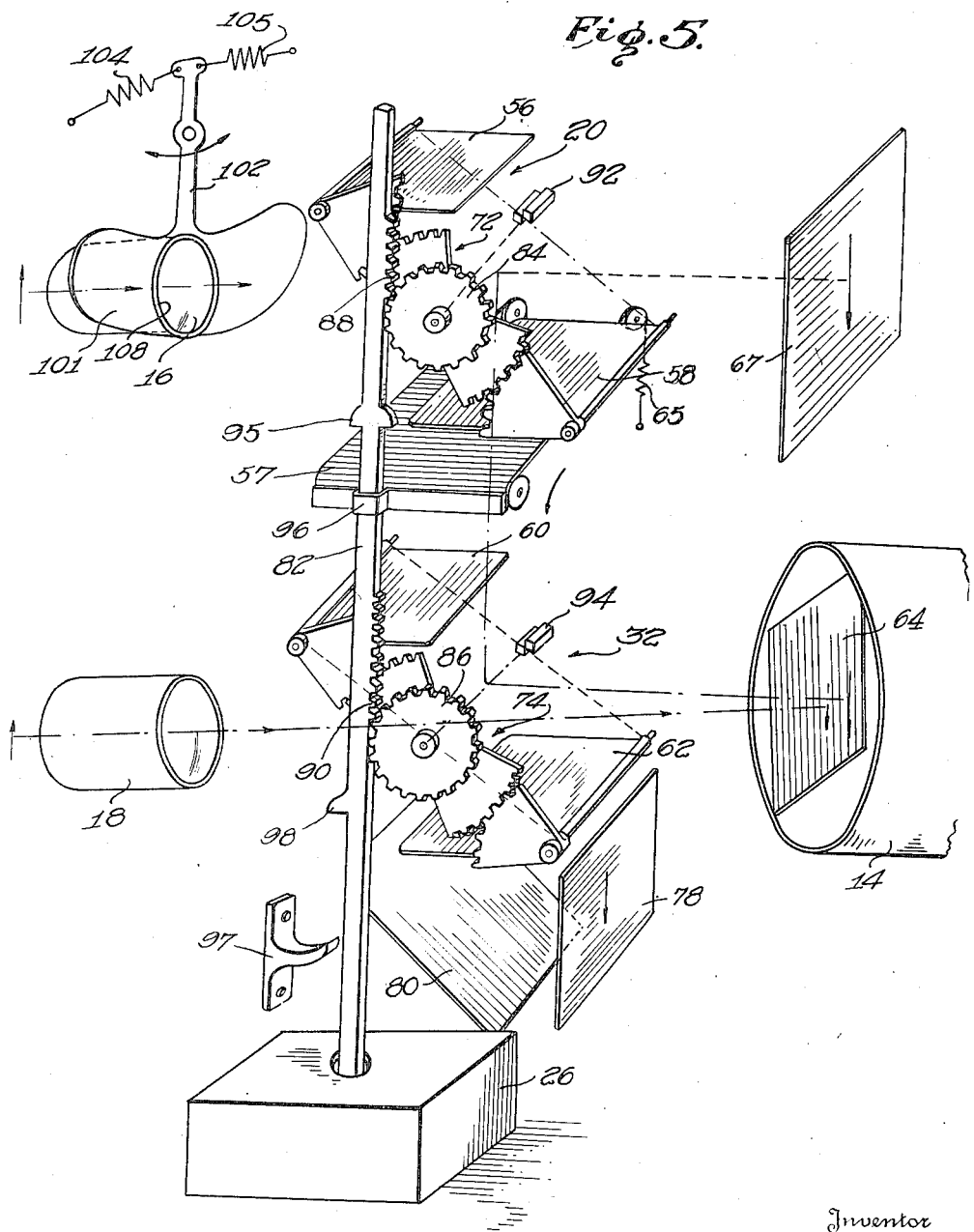

Patented Sept. 6, 1949

2,481,082

UNITED STATES PATENT OFFICE 2,481,082

TELEVISION CAMERA LENS SWITCHING DEVICE

Thornton W. Chew, Washington, D. C.

Application June 4, 1945, Serial No. 597,496

4 Claims. (Cl. 95—44)

This invention relates to cameras and more particularly to a novel optical system therefor which permits the rapid and efficient utilization of a plurality of lenses having different focal lengths.

In the use of motion picture and television cameras it has heretofore been proposed to employ two or more different types of lenses and for the most part such types have been of the short focal length or wide angle of view and the long focal length or narrow angle of view. In prior installations and especially in connection with motion picture cameras, the lenses of different focal lengths have been associated with the camera by means of the well known turret lens mount which enables a desired lens to be shifted from an inoperative position to a position where its optical path is aligned with the photo-sensitive surface. Such a construction, however, is not completely satisfactory for television or motion picture cameras where time is an important factor, it being appreciated that a considerable period of time is required to shift the desired lens into operative position. In addition to this objection it will be understood that in shifting the turret, a relatively large mass must be moved and moreover, unless special and expensive auxiliary equipment is employed, an unpleasant visual effect of swimming images will be experienced during the time the lenses are being shifted.

It is accordingly one of the objects of the present invention to provide a novel lens system for a television or motion picture camera which will be so constituted as to avoid the difficulties heretofore encountered in the systems of the prior art.

Another object of the invention is to provide a relatively simple and light-weight lens system wherein the change in lenses may be quickly accomplished without the unpleasant visual effect of swimming images on the mosaic or film during the time the lenses are being shifted.

Still another object includes a novel arrangement for effecting the change from one lens to another, in a motion picture or television camera, which avoids the use of heavy and bulky mountings and results in a minimum loss of visual information during the change.

Another object is to provide a novel shutter arrangement which is automatically operated to obstruct the passage of light rays through the camera in the event that the latter is panned too rapidly.

A further object resides in the provision of a novel lens system of the foregoing type which is so arranged as to avoid the necessity of shifting the lenses, the construction being such that the optical paths from the lenses are shifted by a relatively simple and inexpensive mechanism.

A still further object is to provide a novel camera and optical system of the foregoing character which will be of light-weight construction, of economical cost, and highly efficient in shifting the field of view from one lens to another without the movement of heavy masses and without the visual effect of swimming images.

Other objects and novel features of the invention will appear more fully hereinafter from the following detailed description when taken in connection with the accompanying drawings illustrating several embodiments of the invention. It will be expressly understood however, that the drawings are employed for purposes of illustration only and are not designed as a definition of the limits of the invention, reference being had for this purpose to the appended claims.

Referring to the drawings, wherein similar reference characters refer to similar parts throughout the several views:

Fig. 1 is a diagrammatic view, partly in section, illustrating a television camera and lens system incorporating the principles of the present invention;

Fig. 2 is a diagrammatic view similar to Fig. 1 but illustrating a modification of the invention wherein one of the plurality of mirrors is shiftable for changing the optical path through the lenses, the parts being adjusted to use the narrow angle lens;

Fig. 3 is a view similar to Fig. 2 but showing the position of the parts when employing the wide angle lens;

Fig. 4 is a diagrammatic view of still another form of the invention wherein the mirrors are comprised of relatively movable sections;

Fig. 5 is a diagrammatic view of the mechanism of Fig. 4 but illustrating a different type of actuating mechanism for the mirror sections;

Fig. 6 is a detail view of an inertia operated shutter device which may be employed in connection with any of the previous optical systems;

Fig. 7 is an enlarged side view of the shutter which is employed in Figs. 2 and 3.

Referring more particularly to Fig. 1, the present invention is illustrated therein as being associated with a television camera 10, having a casing 12 adapted to house a scanning tube 14, the latter being provided with the usual photo-sensitive mosaic, not shown. Lenses 16 and 18 which may respectively be of the narrow angle, long focal length and wide angle, short focal length types, both of which are capable of focus adjustment, are mounted in the front wall of the casing 12, in any suitable manner, and by a novel construction including mirrors 20 and 22, and a shutter 23, are adapted to selectively transmit light rays from an object 24 to the mosaic of tube 14.

In order to provide the above-mentioned selective operation of the lenses 16 and 18, mirror 20 is fixedly mounted within the camera, in any suitable manner, and is provided with a reflecting surface on the side facing the lens 16. Mirror 22 on the other hand, is of a special type and is formed by a clear glass plate having a plurality of spaced-apart silvered islands thereon, the arrangement being such that the total areas of the silvered and clear glass are substantially equal so that the mirror is capable of transmitting images with approximately the same efficiency as its capability of reflecting images. While the aforementioned ratios of reflecting and transmitting areas will usually be found to be the most desirable, it will be understood that other ratios may be used, depending upon the particular effects to be obtained.

For the purpose of selecting the lens to be used at the desired moment, the shutter 23, which may be shifted up or down by any suitable actuating device 26 which is preferably remotely controlled, is provided with a light intercepting portion 28 and a light transmitting portion 30, these parts being so dimensioned and positioned with respect to the lenses 16 and 18, that during movement of the shutter, the transmission of one lens image will increase at substantially the same rate transmission as the other lens image is decreased. Thus the arrangement secures a lap-dissolve effect in shifting from one position to the other.

In operation and with the parts arranged in the position shown, the mirror 22 will transmit the image from the wide angle lens 18 to the tube 14 through the clear glass portion thereof, the image from the narrow angle lens 16 being blocked by the shutter portion 28. If it is now desired to utilize the lens 16, it is only necessary to shift the shutter 23 downwardly whereupon the transmission of the image from lens 16 will increase while the transmission of the image from lens 18 will decrease at substantially the same rate until a point is reached when light transmission from lens 18 is blocked by the shutter portion 28. At such time, complete transmission of the image from lens 16 to the tube 14 will be effected by means of mirror 20 and the reflecting portions of mirror 22. Thus the shift from one lens to another is accomplished in a simple and efficient manner which requires only the movement of the shutter 23 which may be very light in weight and fast in its action.

In the form of the invention illustrated in Figs. 2 and 3, the selection of the desired lens is effected by mechanically changing the position of one of the mirrors of the optical system. More particularly, special mirror 22 of Fig. 1 has been replaced by a mirror 32 of the usual type which is provided with a reflecting surface opposed to the reflecting surface of the mirror 20. The mirror 32 is moreover suitably pivoted at 34 to a stationary part and is associated with a novel shutter and mirror shifting mechanism 36 so that the images from the lenses 16 and 18 may be shifted as clearly shown in Figs. 2 and 3.

In order to accomplish the above-mentioned shift in image transmission, the mechanism 36 comprises a shutter 38, see Fig. 7, which is pivotally mounted upon a stationary pin 40 and normally urged to a position in front of the lens 16, to engage stops 39 and 41, as by means of a spring 42. A rod 43, having an enlarged end 44 passes freely through an opening 46 in the end of the shutter and when moved downwardly by the actuating device 26, serves to positively move the shutter to the dotted line position shown in Fig. 7 in order to allow the image from lens 16 to be transmitted to the mirror 20. Under these conditions, transmission of the image from mirror 20 to mirror 32 and thence to the tube 14 will be effected as illustrated in Fig. 2. In the event it is desired to select the wide angle lens 18, it is only necesary to cause the rod 43 to be moved upwardly whereupon the upper end thereof slips freely through the opening 46 in the end of the shutter 38, and allows the shutter to block the transmission of the image from the lens 16 through movement thereof in response to the action of the spring 42.

One of the features of the present invention resides in the elimination of all visual effects resulting from swimming images during the shift from one lens to the other. A novel arrangement is hence employed which insures that the light from the lens 16 will be intercepted by the shutter 38 during the change in position of the mirror. To this end, the rod 43 is provided with a lug or abutment 47 which is adapted to engage and move the free end of a lever 48, pivotally mounted intermediate its ends upon a stationary part 50, whenever the rod 43 is moved upwardly. The opposite end of lever 48 is pivotally connected to the mirror 32 through a link 52, and adjacent the pivotal mounting 50, the lever 48 is influenced by a spring 54 which normally urges the parts including the mirror 32 to the position shown in Fig. 2. It will be understood from this construction that during upward movement of the rod 43, the lug 47 will engage the end of lever 48 and positively move the mirror 32 to the position shown in Fig. 3 only after sufficient movement of the rod 43 has taken place as to allow the shutter 38 to obstruct the light transmitted through the lens 16. This is due to the novel construction employed, including the slip connection between rod 43 and shutter 38 as well as the spacing of the lug 47 below the free end of lever 48, which allows complete obstruction of the lens 16 before movement of the mirror 32 and clearing of the optical path from lens 18, as shown in Fig. 3.

It will be understood that if it is desired to select the lens 16, the novel construction provided by the present invention insures that the mirror 32 will be moved to the position shown in Fig. 2, under the influence of spring 54, to obstruct the image transmission from lens 18, before the end 44 of the rod 43 contacts and moves the shutter 38 to clear the path from lens 16. Thus swimming of images during the transition from one lens to the other is completely avoided by the novel shutter and pivoted mirror construction of this form of the invention.

A further form of the invention is shown in Fig. 4 which differs from the modification of Figs. 2 and 3 in that the mirrors 20 and 32 are constituted by relatively movable sections 56, 58 and 60, 62, the arrangement being such that when the sections are aligned, as shown in full lines in Fig. 4, the image from lens 16 will be transmitted to the screen or mosaic 64 by reflection from mirrors 20 and 32. On the other hand, when the sections of the mirrors are separated, as indicated in dotted lines, the optical path from the wide angle lens 18 will be undisturbed, while that from lens 16 will be intercepted by a shutter 57.

Novel means are provided by the present invention for operating the sections of the mirrors 20 and 32 in the above described manner and preferably such means is coordinated with the operation of a shutter 57, herein shown as of the bellows type, so that the latter will intercept the image from lens 16 as reflected from mirror 20 before the mirror sections are opened, this construction avoiding the possibility of swimming images as the system is shifted from lens 16 to lens 18. As shown such means includes the rod 43 and lug 47 which is adapted to engage the free end of a pivoted lever 64 when the rod 43 is moved upwardly by the remotely controlled actuating mechanism 26. The opposite end of the lever 64 is pivotally connected to a reciprocating bar or lever 66 which is adapted to actuate a pair of arms 68 and 70, the latter being respectively connected with the mirror sections 58 and 62 and adapted to actuate the associated mirror sections 56 and 60 through suitable sector gear transmissions 72 and 74. Normally, a spring 76 seeks to maintain the parts in the full line position illustrated, whereupon lens 16 is in use and the image from lens 18 may be observed upon the ground glass screen 78 after reflection from the two-sided mirror 32 and mirror 80. Under these conditions, the rod 43 through a cable 59 secured to a collar 61 carried by the rod, moves shutter 57 away from engagement with its stop 63 and against the action of the springs 65 associated therewith, to clear the optical path from the narrow angle lens 16. Upon upward movement of the rod 43, however, the shutter 57 first moves to obstruct the light transmission from the lens 16 as reflected from the mirror 20, and thereafter the lug 47 engages and moves the lever 64 to open the mirror sections 56, 58 and 60, 62, thereby permitting the image from the wide angle lens 18 to be transmitted to the mosaic 64 of the tube 14. Upon opening of the mirror sections 56, 58, the image from lens 16 may be observed upon ground glass screen 67.

The form of the invention illustrated in Fig. 5 is substantially the same as that shown in Fig. 4, except that a modified form of actuating device is employed for moving the shutter 57 and the mirror sections 56, 58 and 60, 62. As shown, the actuating device comprises a bar 82, adapted to be moved upwardly or downwardly by the actuating device 26 for the purpose of rotating gears 84 and 86 through toothed sections 88, 90 formed on the bar. The gears 84 and 86 are respectively adapted to operate the sector gear transmissions 72 and 74 in order to move the mirror sections 56, 58 and 60, 62 toward and away from an aligned position. When the mirror sections are closed they are adapted to contact suitable stops 92 and 94 and when in this position, the lens 16 is effective. With the mirrors opened, as illustrated, lens 18 projects the image directly upon the mosaic of the tube 14.

In order to insure that the sections of the mirrors 20 and 32 are closed before the shutter 57 is opened, a lug or abutment 95 is secured to the bar 82 to contact and actuate the arm 96 secured to the shutter 57 after closure of the mirror sections. Preferably, when the lug 95 contacts the arm 96, the toothed sections 88 and 90 on the bar 82 will clear the gears 84 and 86 and hence any additional movement of the bar 82 will serve to open the shutter 57 against the tension of springs 65 without operating the sections of the mirrors 20 and 32 which remain in closed or aligned position. If desired, a stationary stop 97 may be arranged to engage a lug 98 on the bar 82 in order to arrest downward movement of the latter after the shutter 57 has attained its full open position.

It will be understood that if it is desired to intercept image transmission from the narrow angle lens 16 and permit operation of the wide angle lens 18, it is only necessary to cause upward movement of the bar 82 in order to first allow the springs 65 associated with the shutter 57 to move it to the full line position illustrated. Thereafter, continued upward movement of the bar 82 will bring the toothed portions 88 and 90 into engagement with the respective gears 84 and 86 whereupon the sections of the mirrors are opened to the positions shown through operation of the sector gear transmissions 72 and 74.

It is well known that in the use of motion picture or television cameras, rapid panning movement of the camera produces highly objectionable visual effects, particularly in connection with telescopic lenses. The shutter construction illustrated in Fig. 6 provides a novel, automatically operating device for avoiding the objectionable effects due to rapid panning action. As shown, such device comprises an inertia shutter 100 having an arcuate shutter element 101 and an integrally formed arm 102, the shutter being pivotally mounted at 103 to a fixed part of the camera and normally restrained to occupy the full line position shown, as by means of oppositely acting springs 104 and 105, having opposite ends secured to the upper portion of the arm 102 and to adjustable, relatively stationary anchors 106 and 107. Shutter element 101 is provided with a centrally arranged opening 108 and the entire device is adapted to be mounted just to the rear of the desired lens, see Figs. 4, 5 and 6, with the opening 108 aligned with the lens. In operation, it will be readily understood that as long as the rate of panning movement of the camera does not exceed a predetermined rate, as governed by the tension of the springs 104 and 105, and the weight of the shutter element 101, the opening 108 will permit the image from the lens to be transmitted to the photo-sensitive surface of the camera. As soon, however, as the rate of panning exceeds the predetermined rate, the inertia of the element 101 will be such as to swing the latter one way or the other about the pivot 103 into engagement with stops 109 or 110 to blank out the scene being taken at the moment. It will be understood that the predetermined rate referred to may be readily varied by adjusting the initial tension of the springs 104 and 105 and by using shutter elements of different weights, in order to obtain any desired method of operation. It will also be understood that while the inertia shutter 100 has been illustrated in connection with lenses 16 of Figs. 5 and 6, a similar shutter may also be used with the lenses 18 of these figures.

From the foregoing, it will be readily perceived that the present invention provides a relatively simple, light-weight construction whereby one of the plurality of lenses may be quickly selected and employed for recording any desired scene. It will be moreover noted, that while several different modifications of the invention have been set forth herein, all of them avoid the possibility of swimming or moving images upon the mosaic or other photo-sensitive surface during the change from one lens to another. In addition to the foregoing, the use of the inertia operated shutter device disclosed herein, completely avoids the undesirable visual effects due to a rapid panning movement of the camera.

While the invention has been particularly described in connection with a television camera, it will be understood that the same is equally adaptable to any camera provided with a photo-sensitive surface on which scenes are to be recorded and wherein a plurality of lenses having different focal lengths are utilized. Moreover, while several embodiments of the invention have been illustrated and described herein, it will be understood that the same is not limited to these forms but is capable of a variety of expressions, as will readily appear to those skilled in the art, without departing from the spirit of the invention. Reference will therefore be had to the appended claims for a definition of the limits of the invention.

What is claimed is:

1. In a camera having a photo-sensitive surface and a pair of lenses, the optical axis of one lens being aligned to transmit an image directly to said surface, and the optical axis of the other lens being offset from said surface, means including a pair of spaced-apart angularly positioned mirrors for transmitting an image indirectly from said other lens to the photo-sensitive surface, one of said mirrors being positioned to intercept the image transmission from said one lens to the surface when said mirrors transmit the image from said other lens, and means for interrupting the image transmission from said other lens to the surface, and establishing the image transmission from said one lens to the surface, including a device for sequentially positively intercepting image transmission from said other lens to the surface and for then moving said one mirror out of its image intercepting position.

2. In a camera having a photo-sensitive surface and a pair of lenses, one of said lenses having its optical axis aligned to transmit an image directly to said surface and the other lens having its optical axis offset with respect to said surface, means including a pair of spaced-apart angularly positioned light reflecting members for transmitting an image indirectly from said other lens to the surface, one of said members being positioned in the optical path from said one lens to the surface and intercepting the image transmission from said one lens to the surface when the members transmit the image indirectly from said other lens, and means for interrupting the said indirect image transmission from said other lens to the surface, and establishing the direct image transmission from said one lens to the surface, including a movable shutter, and connections between the shutter and said one light reflecting member for first moving the shutter to interrupt image transmission from said other lens to the surface and for thereafter moving said one light reflecting member out of the optical path between said one lens and surface.

3. In a television camera having a photo-sensitive surface and a pair of lenses, the optical axis of one lens being aligned to transmit an image directly to said sensitive surface, and the axis of the other lens being offset from optical axis of the other lens being offset from said sensitive surface, means to transmit an image indirectly from said optical offset lens to said photo-sensitive surface including a pivotally movable light reflecting member, said light reflecting member being alternately positioned in the optical path from said optically aligned lens to said surface and intercepting image transmission from said aligned lens to said surface when said light reflecting member transmits the image from said offset lens to said surface, and means for interrupting image transmission from said offset lens to the surface and establishing image transmission from said aligned lens to said surface including a movable shutter and mechanical linkage between said shutter and said light reflecting member, said linkage cooperative sequentially for first moving said shutter to interrupt image transmission from said offset lens to the surface and for thereafter moving said light reflecting member out of the optical path between said aligned lens and surface.

4. In a camera having a substantially flat photo-sensitive surface and a pair of optical systems for separately projecting an image on said surface, one of said systems including a lens having its optical axis aligned to transmit an image directly to said surface, and the other system including a lens having its optical axis offset from said surface, means included in said other system for transmitting an image indirectly from said optically offset lens to said surface including a pair of angularly positioned spaced apart light reflecting members, one member being positioned in the optical path from the optically aligned lens to the surface and including a pair of pivoted sections arranged in closed and aligned position to simultaneously transmit the image indirectly from said optically offset lens to said surface and to intercept direct image transmission from the optically aligned lens to said surface, and means for interrupting indirect image transmission from said offset lens to the surface and establishing direct image transmission from said aligned lens to said surface comprising a movable shutter, and mechanical linkage between the shutter and the pivoted sections of said member for sequentially moving said shutter to interrupt indirect image transmission from the offset lens to the surface and for thereafter moving said pivoted sections to an open position out of the optical path between the aligned lens and said surface.

THORNTON W. CHEW.

REFERENCES CITED

The following references are of record in the file of this patent:

UNITED STATES PATENTS

| Number | Name | Date |
|---|---|---|
| 1,275,249 | Hlavaty | Apr. 13, 1918 |
| 1,310,776 | Akeley | July 22, 1919 |
| 1,326,379 | Thompson | Dec. 30, 1919 |
| 1,505,268 | Larson | Aug. 19, 1924 |
| 1,525,741 | Hutchings | Feb. 10, 1925 |
| 1,744,788 | Mery | Jan. 28, 1930 |
| 1,795,626 | Watkins | Mar. 10, 1931 |
| 1,809,338 | Hayden | June 9, 1931 |
| 1,854,132 | Ginsberg | Apr. 12, 1932 |
| 1,873,571 | Fried | Aug. 23, 1932 |
| 1,967,468 | Douglass | July 24, 1934 |
| 2,120,654 | Spence et al. | June 14, 1938 |
| 2,153,198 | Mihalyi | Apr. 4, 1939 |
| 2,377,954 | Mellien | June 12, 1945 |

FOREIGN PATENTS

| Number | Country | Date |
|---|---|---|
| 22,985 | Great Britain | 1911 |